United States Patent
Fujishiro et al.

(10) Patent No.: US 6,360,247 B1
(45) Date of Patent: *Mar. 19, 2002

(54) INFORMATION PROCESSING SYSTEM, COMMUNICATION METHOD, AND RECORDING MEDIUM

(75) Inventors: Takahiro Fujishiro, Yokohama; Susumu Matsui, Machida; Yasuhiro Takahashi, Sagamihara; Taro Saito, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/313,971

(22) Filed: May 19, 1999

Related U.S. Application Data

(63) Continuation of application No. 08/943,242, filed on Oct. 3, 1997, now Pat. No. 5,907,676.

(30) Foreign Application Priority Data

Oct. 4, 1996 (JP) .............................................. 8-264228

(51) Int. Cl.[7] .............................................. G06F 15/16
(52) U.S. Cl. ...................... 709/203; 709/227; 709/223
(58) Field of Search ................. 709/227, 223, 709/217, 203

(56) References Cited

U.S. PATENT DOCUMENTS

| 5,245,651 A | 9/1993 | Takashima et al. .... 379/100.14 |
| 5,309,442 A | 5/1994 | Saeki ......................... 370/354 |
| 5,539,885 A | 7/1996 | Ono et al. ............. 395/200.33 |
| 5,581,555 A | 12/1996 | Dubberly et al. ........... 370/487 |
| 5,699,171 A | 12/1997 | Minamizawa ............... 358/440 |
| 5,907,676 A | * 5/1999 | Fujishiro et al. ............ 709/227 |

FOREIGN PATENT DOCUMENTS

JP            9331334        12/1997

OTHER PUBLICATIONS

Nikkei Communications "Using Network PDA", T. Inagawa, No. 222, pp 74–88, May 20, 1996.

* cited by examiner

Primary Examiner—Ayaz Sheikh
Assistant Examiner—Philip B. Tran
(74) Attorney, Agent, or Firm—Antonelli, Terry, Stout & Kraus, LLP

(57) ABSTRACT

An information processing system continues communication without affecting the operation of an application when a communication line is disconnected due to a communication error. When the application sends a communication connection request to another system, an MS Manager portion connects the application via a communication line. An MS portion sends a control handle, instead of a communication line handle, to the application. When the application sends data, the MS portion changes the control handle appended to the data to the handle of the actual communication line. When data is received from another system, the MS portion changes the handle of the actual communication line to the control handle and passes the control handle to the application. When the communication line is disconnected due to an error, the MS Manager portion connects the application to the other system via another communication line. The MS portion re-sends data not yet received by the other system if there are any.

14 Claims, 9 Drawing Sheets

FIG.7

710 MANAGEMENT TABLE

| NO. | CONTROL CONNECTION HANDLE | COMMUNICATION CONNECTION HANDLE | PARTNER ID (IP ADDRESS) | PARTNER PHYSICAL ADDRESS |
|---|---|---|---|---|
| 1 | 1 | 11 | 1 | 101 |
| 2 | 2 | 22 | 2 | 102 |
| 3 | 3 | 33 | 3 | 103 |
| N | N | NN | N | 10N |

⇓ COMMUNICATION CONNECTION HANDLES ARE UPDATED AFTER RECONNECTION

710 MANAGEMENT TABLE

| NO. | CONTROL CONNECTION HANDLE | COMMUNICATION CONNECTION HANDLE | PARTNER ID (IP ADDRESS) | PARTNER PHYSICAL ADDRESS |
|---|---|---|---|---|
| 1 | 1 | 12 | 1 | 101 |
| 2 | 2 | 23 | 2 | 102 |
| 3 | 3 | 34 | 3 | 103 |
| N | N | NO | N | 10N |

FIG.8

810 HANDLE MANAGEMENT TABLE

| NO. | CONTROL CONNECTION HANDLE | MS MANAGER MODULE COMMUNICATION HANDLE | COMMUNICATION CONNECTION HANDLE |
|---|---|---|---|
| 1 | 1 | 11 | 111 |
| 2 | 2 | 22 | 222 |
| 3 | 3 | 33 | 333 |
| N | N | NN | NNN |

⬇ COMMUNICATION CONNECTION HANDLES ARE UPDATED WHEN MS MANAGER MODULE COMMUNICATION HANDLES ARE CHANGED AFTER RECONNECTION

810 HANDLE MANAGEMENT TABLE

| NO. | CONTROL CONNECTION HANDLE | MS MANAGER MODULE COMMUNICATION HANDLE | COMMUNICATION CONNECTION HANDLE |
|---|---|---|---|
| 1 | 1 | 12 | 112 |
| 2 | 2 | 23 | 223 |
| 3 | 3 | 34 | 334 |
| N | N | NO | NNO |

# INFORMATION PROCESSING SYSTEM, COMMUNICATION METHOD, AND RECORDING MEDIUM

This is a continuation of application Ser. No. 08/943,242, filed Oct. 3, 1997 now U.S. Pat. No. 5,907,676.

BACKGROUND OF THE INVENTION

1. Field of the Invention

This invention relates to an information processing system, with a communication function, which does not affect the operation of an application even if communication is disconnected due to a failure.

2. Description of Related Art

For an information processing system such as a notebook personal computer, electronic pocket-notebook, or hand-held terminal, which has a communication program or a communication unit installed in it, it has become more popular for a user to send data over a wireless communication line as mobile telephones have become more popular. In this case, the user starts an application in the information processing system, starts a communication program, and then connects a communication line to the information processing system, using a mobile telephone via a communication unit, for communication with another information processing system.

In a situation in which the quality of wireless communication is poor, for example, when data is sent from a mobile telephone while the user is in a vehicle or when the communication quality changes dynamically due to interference or external noises, the communication line sometimes becomes disconnected. If such a failure occurs before all the data is sent, the user must start the application and the communication program again in order to connect the communication line to the information processing system. This applies also to wire communication, such as a LAN, in which communication quality is relatively reliable and therefore an application does not anticipate that communication will be disconnected before all the data has been sent. When a connection is disconnected in such a case, the application is terminated prematurely and does not send data. This means that the user must repeat the same operation again from the beginning. In particular, a user who has been using a database or electronic mail must type the user ID and password again. This operation is very troublesome.

One known method for recovering from a communication line disconnection is described in "Using Network PDA" in Nikkei Communication No. 222.

In this method, an application program is modified so that data to be sent is stored in a spool area within a sending system before communication starts. The communication program also sends data from the spool area to a receiving system. The communication program in the receiving system also stores received data in its spool area. The application program in the receiving system references the spool area to obtain data. When communication is disconnected, for example, due to a failure, the communication program automatically reconnects the communication line to the information processing system, eliminating the need for the user to repeat the operation.

SUMMARY OF THE INVENTION

However, the above known method requires a user to modify an application program. That is, the user cannot use the application without modifying the program.

In view of the foregoing, it is an object of the present invention to provide an information processing system, communication method, and recording medium which allow a user to continue communication without affecting application operation and without having to modify the application program even when communication is disconnected due to a communication error or so.

To solve the problems described above, a system according to the present invention is an information processing system which starts an application for communication with another information processing system, comprising:

connection means for making connection with said another information processing system via a communication line in response to a communication request sent from said application to said another information processing system;

identification reporting means for reporting to said application an identification of a pseudo line instead of an identification of said communication line;

change means for changing the identification of said pseudo line to the identification of said communication line upon receiving data, to which the identification of said pseudo line is attached, from said application, to send the data to the other information processing system, and for changing the identification of said communication line to the identification of said pseudo line upon receiving data, to which said identification of said communication line is attached, from said another information processing system, as to pass said data to said application; and detection means for detecting that said communication line is disconnected due to a communication error on said communication line, wherein said connection means makes connection with said another information processing system via another communication line different from said disconnected communication line when said detection means detects said disconnection and wherein, after said connection means makes connection with said another information processing system via said another communication line, said change means changes the identification of said pseudo line to the identification of said another communication line upon receiving data, to which the identification of said pseudo line is attached from said application, sends the data to said another information processing system, and changes the identification of said another communication line to the identification of said pseudo line upon receiving data, to which said identification of said another communication line is attached, from said another information processing system.

In this invention as described above, when an actual communication line is disconnected due to a communication error, the connection means connects to said another information processing systems via said another communication line. When the connection means makes connection with said another information processing system via said another communication line, the change means performs the following processing upon receiving data from the application. That is, the change means changes the identification data of the pseudo communication line attached to the data to the identification data of said another communication line and sends the application data to said another information processing system. In addition, upon receiving data from said another information processing system, the change means changes the identification data of said another communication line attached to the received data to the identification data of the pseudo line. This enables the application to send data with the identification data of the pseudo line attached to the data and to receive data with the identification data of the pseudo line attached. Even when a communication error occurs on the actual communication line, the pseudo line is not disconnected, and the application therefore is not affected and communication is continued. When the socket interface of TCP/IP (Transmission Control Protocol/Internet Protocol) is used, the identification data of a communication line corresponds to a handle of the socket, and a pseudo line corresponds to a connection established within an information processing system.

BRIEF DESCRIPTION OF THE DRAWINGS

FIG. 7 is a diagram showing a table provided in an MS Manager portion 205 of the embodiment according to the present invention.

FIG. 8 is a diagram showing a table provided in an MS portion 204 of the embodiment according to the present invention.

DESCRIPTION OF PREFERRED EMBODIMENTS

An embodiment of the present invention will be described with reference to the drawings.

Figure 1:
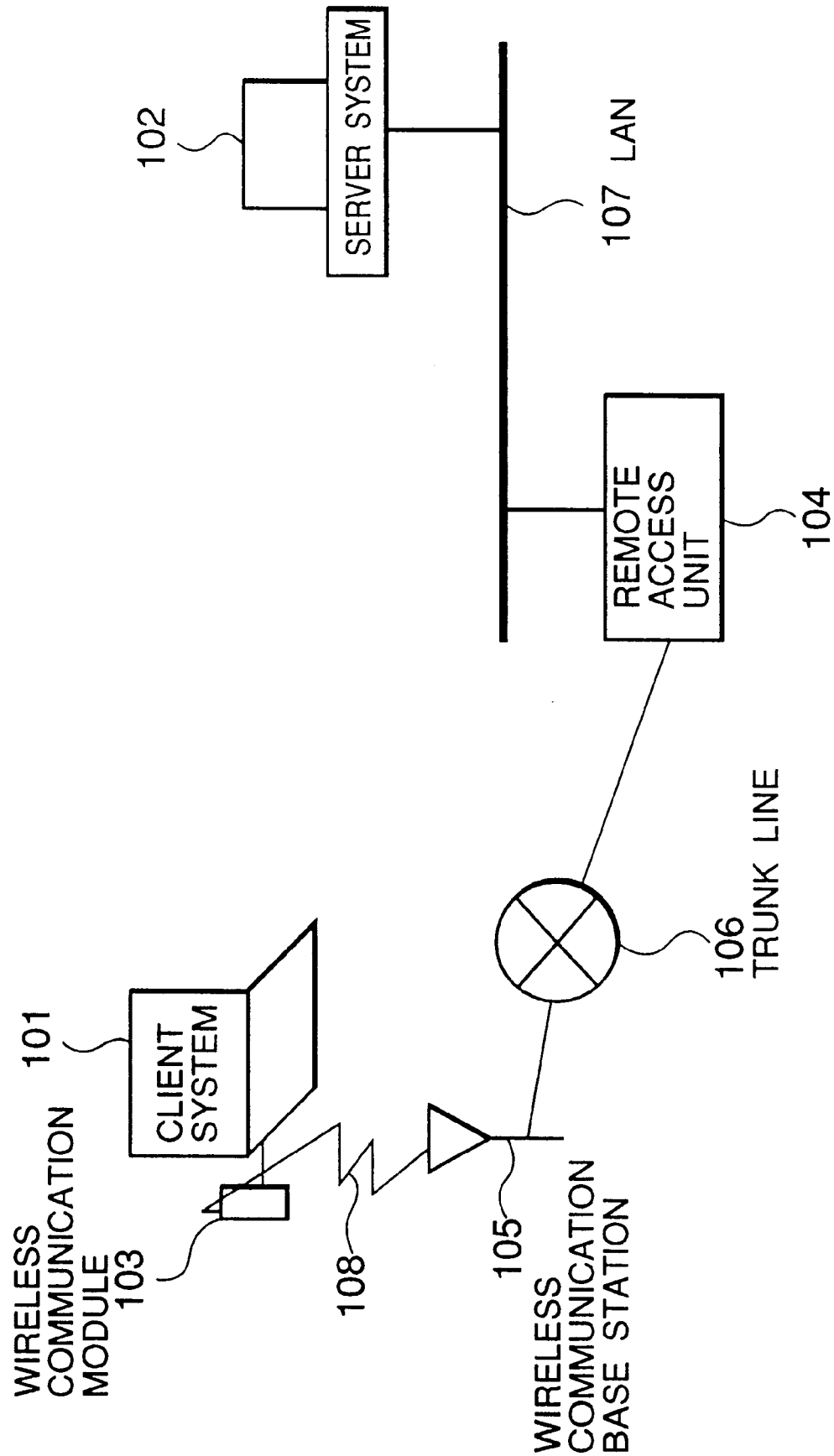
FIG. 1 is a configuration diagram showing an information processing system of an embodiment according to the present invention.

FIG. 1 shows an example of the structure of a data processing communication system of an embodiment according to the present invention. Number 101 is a client system and number 102 is a server system. Each is a computer for data processing, with communication means. The client system 101, which has a wireless communication portion 103, has wireless communication with a wireless communication base station 105. The server system 102 connects to a LAN (Local Area Network) 107 to which a remote access unit 104 which is accessible remotely is connected. The wireless communication portion 103 allows the client system 101 to access the remote access unit 104 via the wireless communication base station 105 and a trunk line 106 for connection with the server system 102 over the LAN 107.

Figure 2:
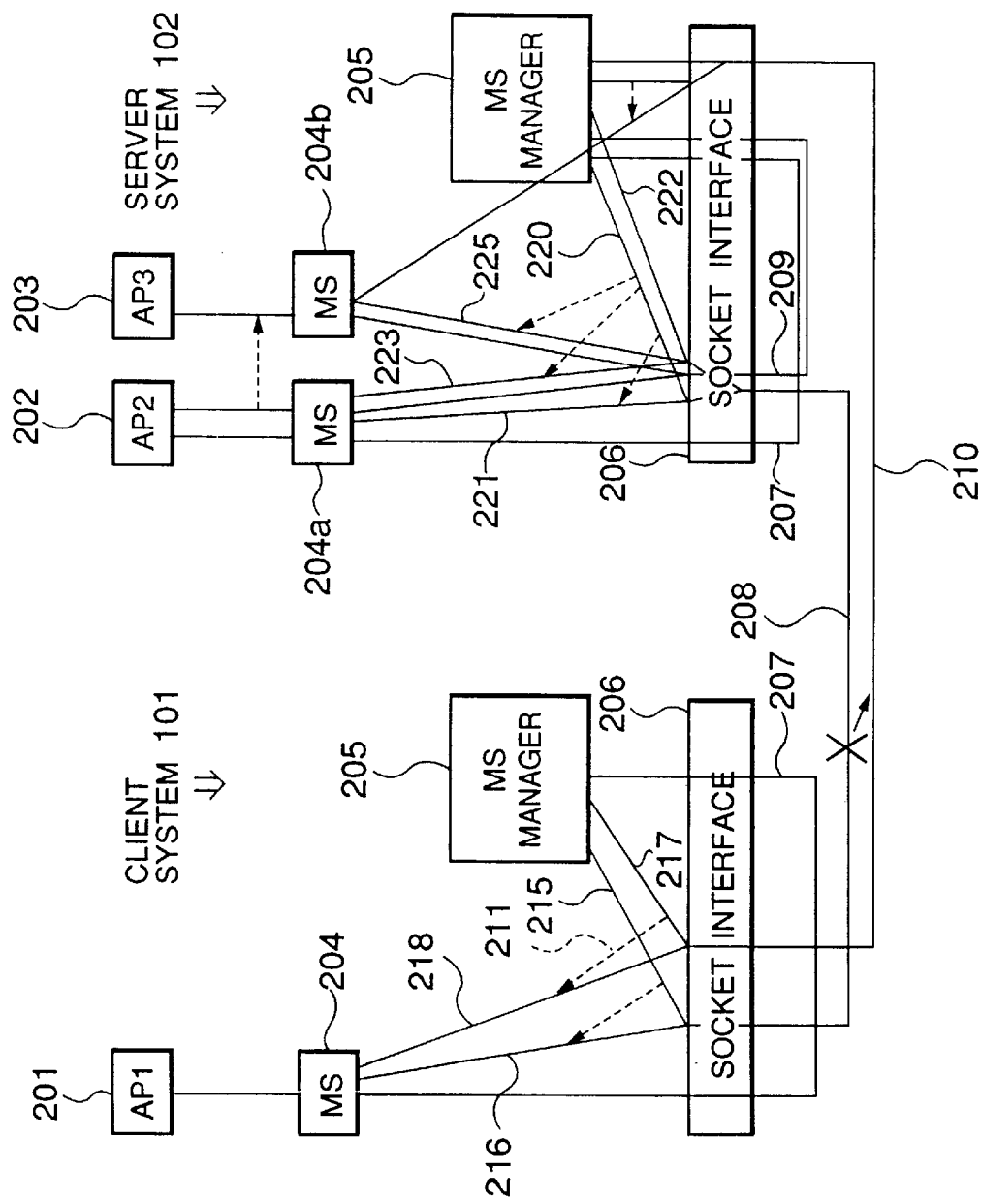
FIG. 2 is a conceptual diagram showing a software configuration of the embodiment according to the present invention.

FIG. 2 is a conceptual diagram of a software configuration in which data is transferred between the client system 101 and the server system 102. In the embodiment of this invention, the socket interface of TCP/IP is used. Numbers 201, 202, and 203 refer to applications (AP), such as an electronic mail (e-mail) or a database, executed on the client system 101 and server system 102. An MS Manager portion 205, a management means, manages the connection. For example, when communication is broken, the portion automatically re-establishes connection. An MS (Mobile Socket) portion 204, a pseudo socket interface means for mobile communication, sends or receives data according to connections managed by the MS Manager portion 205. The MS Manager portion 205 and the MS portion 204 may be two separate software programs or they may be a single software. A user gets a CD-ROM or a floppy disk containing this software and installs the software in an information processing system for execution. In addition, the MS portion 204 and the MS Manager portion 205 may be executed on a general-purpose processor preprogrammed to execute the steps of the software program or on a hardware unit containing wired logic for executing the steps of the software program, or may be a combination of the general-purpose processor and the hardware unit. The MS portion 204 provides an application with an interface similar to the socket interface provided by the operating system, and is located between the socket interface of the operating system and the application program. Communication is performed by the socket interface of the operating system. This appears to a higher-level application program as if a conventional interface is provided, eliminating the need for providing a communication driver for each operating system.

Communication between computers is performed via a socket interface 206 provided by the operating system. An application sends data to, or receives data from, an application on a partner computer via this socket interface. For an application to send data, the application requests the operating system to create a socket and then connects the socket with a socket created similarly on the communication partner. A connection between one socket and another is called a "connection" through which an application sends or receives data. In the embodiment of the present invention, the MS Manager portion 205 creates a connection. If the connection is broken due to a failure before data is sent completely, the MS Manager portion 205 creates another connection for the application. The MS Manager portion 205 does this transparently to the application program, thus preventing the application from being affected by the failure. This is done as follows. First, when an application sends a communication connection request to another application, the MS portion 204 accepts the request and sends it to the MS Manager portion 205 via, for example, a control connection 207 which is handle '1' (for a handle, see FIG. 8). The MS Manager portion 205 creates a connection to the communication partner computer via, for example, a socket interface 215 which is the handle '11' and a communication line 208, and connects the application. To use the same socket interface as the socket interface 215 which is the handle '11', the MS portion 204 sends "Duplicate" (duplication command) to the socket interface of the operating system. Then, the handle '111' which identifies the same socket interface is assigned. And, through the handle '111', the MS portion 204 communicates with the communication partner via the communication line 208. In addition, the MS portion 204 informs the application of the handle '1', which is a control connection, instead of the handle '111'. When the application sends data, the MS portion 204 changes the handle '1', which is appended to the data, to the handle '111'; when the application receives data from the other computer, the MS portion 204 changes the handle '111', which is appended to the data from the other computer, to the handle '1'. When the communication line is disconnected due to a failure, the MS Manager portion 205 reconnects the application to the other computer via another line 210. If there is data not yet received by the other computer due to a failure, the MS portion 204 re-sends it. To do so, the sending computer stores data with the transmission sequence numbers assigned and the receiving computer returns the number of each data item as a received data number. Comparing the data numbers of data items which have been sent with those of data items which have been received enables the MS portion 204 to re-sent data not yet sent. When the application sends data after reconnection, the MS portion 204 changes the handle '1', which is appended to the data, to the handle '112' identifying the newly-connected line 210; when the application receives data from the other computer, the MS portion 204 changes the handle '112', which is appended to the data, to the handle '1'.

Figure 3:
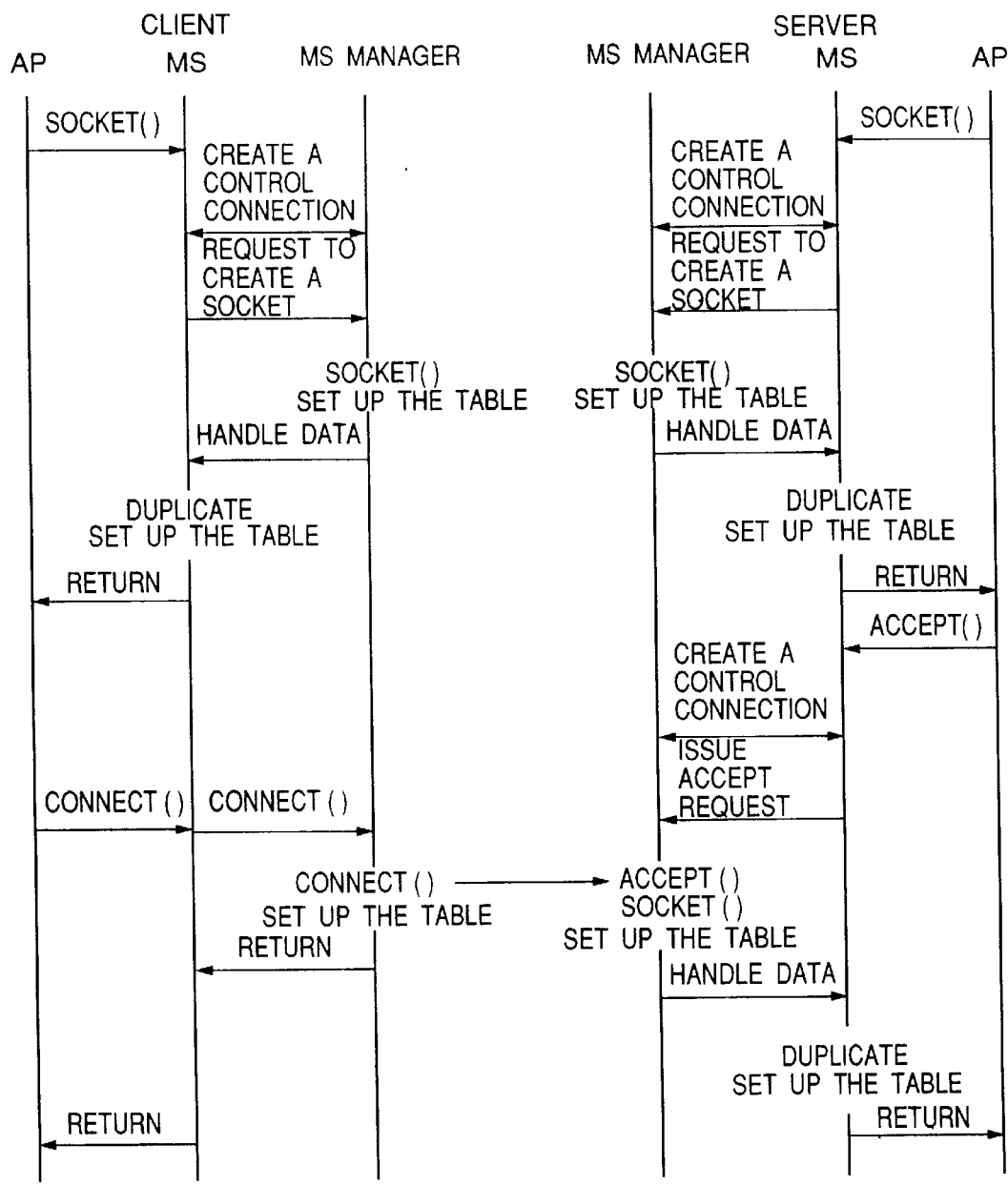
FIG. 3 is a connection sequence diagram when communication is performed in the embodiment according to the present invention.
Figure 4:
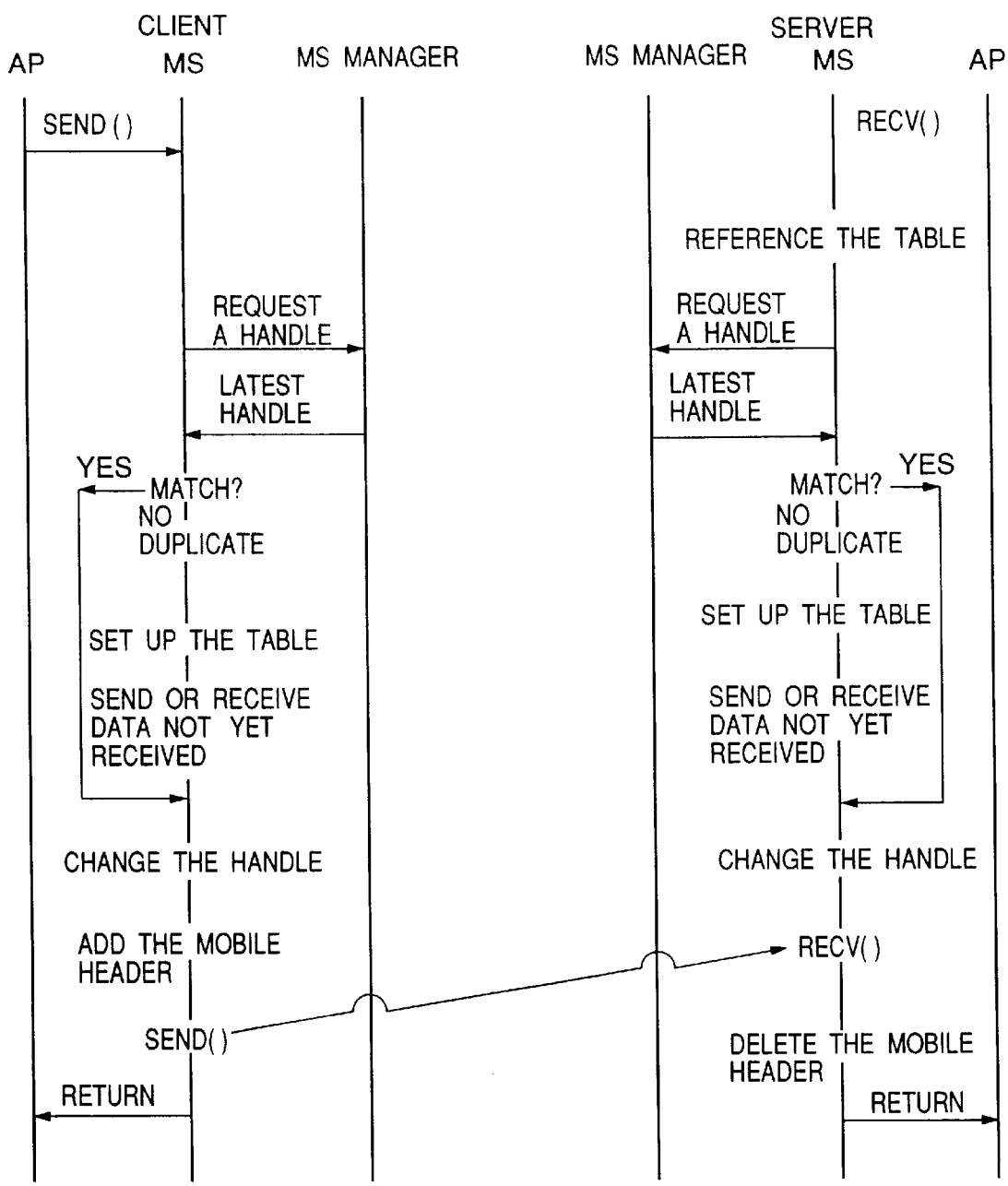
FIG. 4 is a communication sequence diagram when communication is performed in embodiment according to the present invention.
Figure 5:
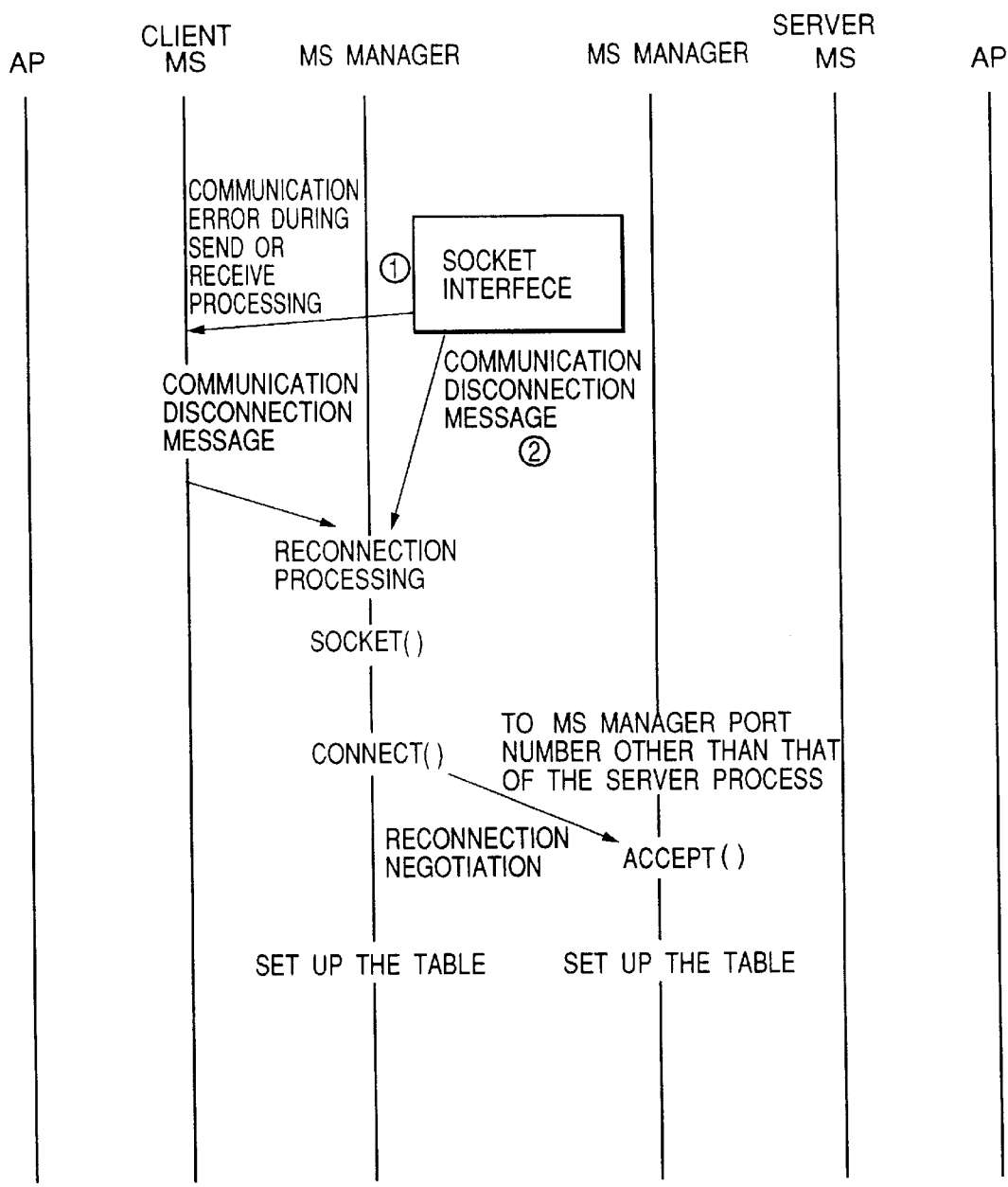
FIG. 5 is a connection sequence diagram when reconnection is performed in the embodiment according to the present invention.
Figure 6:
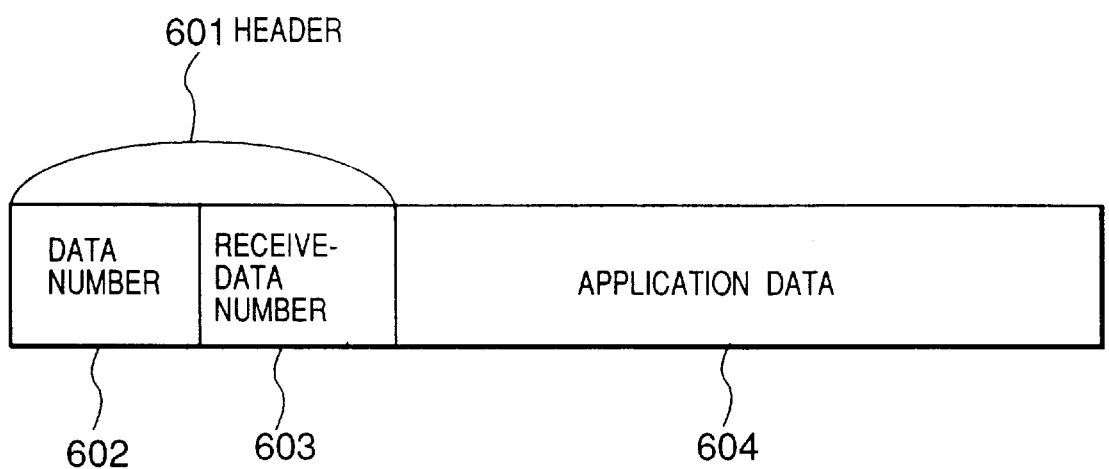
FIG. 6 is a diagram showing the structure of communication data used in the embodiment according to the present invention.

Next, the communication procedures used in the embodiment of the present invention will be described in detail with reference to FIGS. 3 to 8. FIG. 3 shows a communication procedure for creating a connection between the client system 101 and the server system 102, FIG. 4 shows a procedure for changing handles in the client system 101 and the 102, and FIG. 5 shows a communication procedure when a communication line is disconnected. FIG. 6 shows the format of data transferred between the client system 101 and the server system 102. FIG. 7 shows a connection management table 710, and FIG. 8 shows a handle management table 810 provided in the MS portion 204.

In FIG. 3, when an application issues a communication connection request (command socket ()), the MS portion 204 accepts it and, as shown in FIG. 2, issues a request to create a control connection 207 between the MS portion 204 and the MS Manager portion 205. When the MS Manager portion 205 requests the socket interface 206 of the operating system to create the control connection 207, a handle identifying the control connection 207, for example '1', is created and is passed to the MS portion 204. The MS Manager portion 205 stores the created handle '1' into the control connection handle storage column of the connection management table 710 shown in FIG. 7. The MS Manager portion 205 stores handles into the connection management table 710 in the sequence in which they are created. Then, via the control connection 207, the MS portion 204 requests the MS Manager portion 205 to create a socket to make a communication connection request. Upon receiving the socket creation request, the MS Manager portion 205 issues the command sockets to the socket interface 206 to create a socket. When a handle identifying the socket, for example '11', is generated, the MS Manager portion 205 passes it back to the MS portion 204. In addition, the MS Manager portion 205 stores the handle '11' into the communication handle storage column of the connection management table 710 shown in FIG. 7 and informs the MS portion 204 that the handle '11' has been set up. To use the same socket as the socket 215 which is the handle '11', the MS portion 204 issues 'Duplicate' (duplication command) (211 in FIG. 2) to the socket interface of the operating system. Then, the handle '111' identifying the same socket 216 which is the same as socket 215 is assigned. The MS portion 204 stores '11' into the MS Manager portion communication handle column of the handle management table 810 shown in FIG. 8. The handle '11' is in the same row containing the handle '1'. The MS portion 204 also stores '111' into the communication connection handle column of the table. The handle '111' is in the same row containing the columns for the handles '1' and '11'. In addition, the MS portion 204 passes the control connection handle '1' to the application. As will be described later, the application sends data by associating it with the handle '1' identifying the control connection.

Next, the procedure for establishing a connection will be described. This procedure varies between the client which sends a connection request and the server which receives the connection request. In the server, upon receiving the accept( ) command from the application, the MS portion 204 sends the accept request to the MS Manager portion 205. The MS Manager portion 205 has a special predetermined port which has a predetermined socket and which is always waiting to accept the accept( ) command. In order to let the predetermined port be on a standby, the MS Manager portion 205 sends the command from that port to another port to establish an accept request connection after the accept request connection is accepted. Therefore, when the MS portion 204 in the server accepts the accept( ) command from the application, another control connection is created between the MS portion 204 and the MS Manager portion 205 (209 shown in FIG. 2). The accept request is sent to the MS Manager portion 205 via this control connection 209. The MS Manager portion 205 in the client specifies an identification number (IP address) of the server to which the client is to connect and establishes a connection via the special port. When the connection is established, the server does the following to change the port to another. That is, the server issues the socket( ) command to the socket interface 206 to cause it to create a socket and assign a handle. Then, the server issues the send( ) command to send to the client the physical address of the port corresponding to the created socket. The client issues the recv( ) command to obtain the physical address. The received physical address and the IP address are stored into the corresponding columns of the management table in the MS Manager portion 205 shown in FIG. 7. They are in the same row as the control connection handle and the communication connection handle. The stored physical address is used later for reconnection, for example, when an error occurs. On the other hand, the MS Manager portion 205 in the server stores the handle of the created socket into the management table of the MS Manager portion 205, shown in FIG. 7, in the same row containing the column for the control connection handle, and informs the MS portion 204 of the assigned handle. The MS portion 204 issues 'Duplicate' (duplication command), in the same manner as described above, to cause the socket interface to assign a handle identifying the same socket, and stores the assigned handle into the corresponding column of the handle management table 810 shown in FIG. 8. The MS portion 204 passes the control connection handle to the application. This processing allows the socket created first to be used in the MS Manager portion 205 as a special port for waiting for an accept request. Actual communication is performed using a socket created after the accept request is accepted.

A connection between the client system and the server system is established according to the procedure described above.

Next, how data is sent after the connection is established is described with reference to FIG. 4. The application sends a communication request (send( ) command) to send data with the control connection handle '1' added. Upon receiving the communication request (send command ( )) from the application, the MS portion 204 references the handle management table 810 shown in FIG. 8, obtains the communication connection handle '111' corresponding to the control connection handle '1', and converts the control handle to the actual communication handle for communication. At this time, the MS portion 204 asks the MS Manager portion 205 if the current handle matches the latest handle with which the connection is associated. This is done because, if the line is disconnected due to a failure, the handle is changed to the handle of another line that will be used. This will be described later. Upon receiving a handle request from the MS portion 204 via the control connection 207, the MS Manager portion 205 references the connection management table 710 shown in FIG. 7 and informs the MS portion 204 of the communication connection handle corresponding to the handle of the control connection 207. The MS portion 204 compares the communication connection handle reported by the MS Manager portion 205 with the MS Manager portion communication handle stored in the handle management table 810 shown in FIG. 8. When both handles match, the MS portion 204 as described above changes the handle '1', added to the data from the application, to the handle '111'. Before data is sent, the MS portion 204 adds a header 601 to the data (application data) to be sent from the application, as shown in FIG. 6. This header is added to check at a later time that data has been sent successfully. The header 601 is composed of a data number 602 indicating the number of data to be sent and a receive data number 603 indicating data received from the communication partner. The MS portion 204 has three components: a send counter used to add a sequential number to each item of application data to be sent, a receive counter which contains the send-data number of each item of data received from the communication partner, and a memory in which application data and the corresponding send data numbers are stored. For each item of application data to be sent, the MS portion 204 stores the send-data number into the field of the data number 602 and stores the receive-data number indicated by the receive counter into the field of the receive-data number 603. On the other hand, when data is received from the communication partner, the MS portion 204 obtains the data number 602 from the header 601 added to the data and increments the receive counter so that it indicates the value of the data number 602. The MS portion 204 also obtains the receive data number 603 to make sure that data has been received by the communication partner, and deletes the receive data number 603 and associated application data from the memory. This means that the memory contains only data that is not yet acknowledged by the communication partner. Then, the MS portion 204 deletes the header 601 from the data sent from the communication partner, changes the handle '111' added to the data to the handle '1', and passes the data to the application. In this manner, both the client terminal and the server terminal add send data numbers and receive data numbers to send-data and receive-data, respectively, before data is transferred. The receive data numbers added to the data make it possible to check that the data has been received by the partner successfully.

When the communication connection handle reported by the MS Manager portion 205 does not match the MS Manager portion communication handle in the handle management table 810 shown in FIG. 8, the connection indicated by the current handle was disconnected and the connection has been reconnected by the MS Manager portion 205 using another line. This will be described later. Therefore, the MS portion 204 issues 'Duplicate' (duplication command) to the socket interface according to the latest handle to obtain a handle identifying the same socket. For example, the MS portion 204 stores a new handle '12' in the MS Manager portion communication handle column of the handle management table 810 that is in the row for the handle '1'. Similarly, the MS portion 204 stores '112' in the communication connection handle column in the row for handles '1' and '12'. In addition, the MS portion 204 re-sends data not yet received by the partner because of a line disconnection. In this case, the MS portion 204 adds a send data number to application data stored in the memory, adds a receive data number, and adds the latest communication connection handle before re-sending data. Because both the client terminal and the server terminal re-send data, there is no unsent data even if the line is disconnected. In addition, the MS portion 204 resends data, and the application is not affected by the disconnection.

After that, the MS portion 204 references the handle management table 810, shown in FIG. 8, to process a communication request (send ( ) command) from the application, obtains the communication connection handle '112' corresponding to the control connection handle '1', converts the control connection handle to the actual communication handle, and performs communication. Before communication, the MS portion 204 adds the header 601 indicated by number 601 in FIG. 6 and sends data.

The following explains, with reference to FIG. 5, reconnection processing that is executed, for example, when the communication line is disconnected due to a failure.

FIG. 5 shows how processing is executed when a connection is broken by a communication error. In FIG. 5, the socket interface of the operating system, which detects a communication line disconnection, sends a communication error message or a communication disconnection message to the MS portion 204 or to the MS Manager portion 205. When the MS portion 204 receives a communication error message, it sends a communication disconnection message to the MS Manager portion 205. When the MS Manager portion 205 receives a communication error message or a communication disconnection message, it performs reconnection processing. This reconnection processing is started in the client. When the MS Manager portion 205 performs connection processing, it does not connect to the socket at which the server application is waiting; rather, it connects to the socket using the physical address (see FIG. 7) of the special port created by the MS Manager portion 205 of the server and establishes the communication line 210 for the connection. To do so, the MS Manager portion 205 references the connection management table 710 shown in FIG. 7 and performs negotiation based on the physical address of the special port. The MS Manager portion 205 updates the handle by storing a new handle in the connection management table 710 while maintaining compatibility with the previous connection.

As described above, when a line is disconnected by a failure, the MS Manager portion 205 establishes a new connection and replaces the disconnected communication connection with the new connection. The MS portion 204 checks if the handles match to ascertain that the line was disconnected and then reconnected. The application can continue processing without being affected even if the line is disconnected. That is, the disconnection of a communication connection is invisible to the application. The connection specified by a control connection handle, an internal connection within one computer, is never disconnected. This means that the application is not interrupted by the disconnection of a communication connection.

Figure 9:
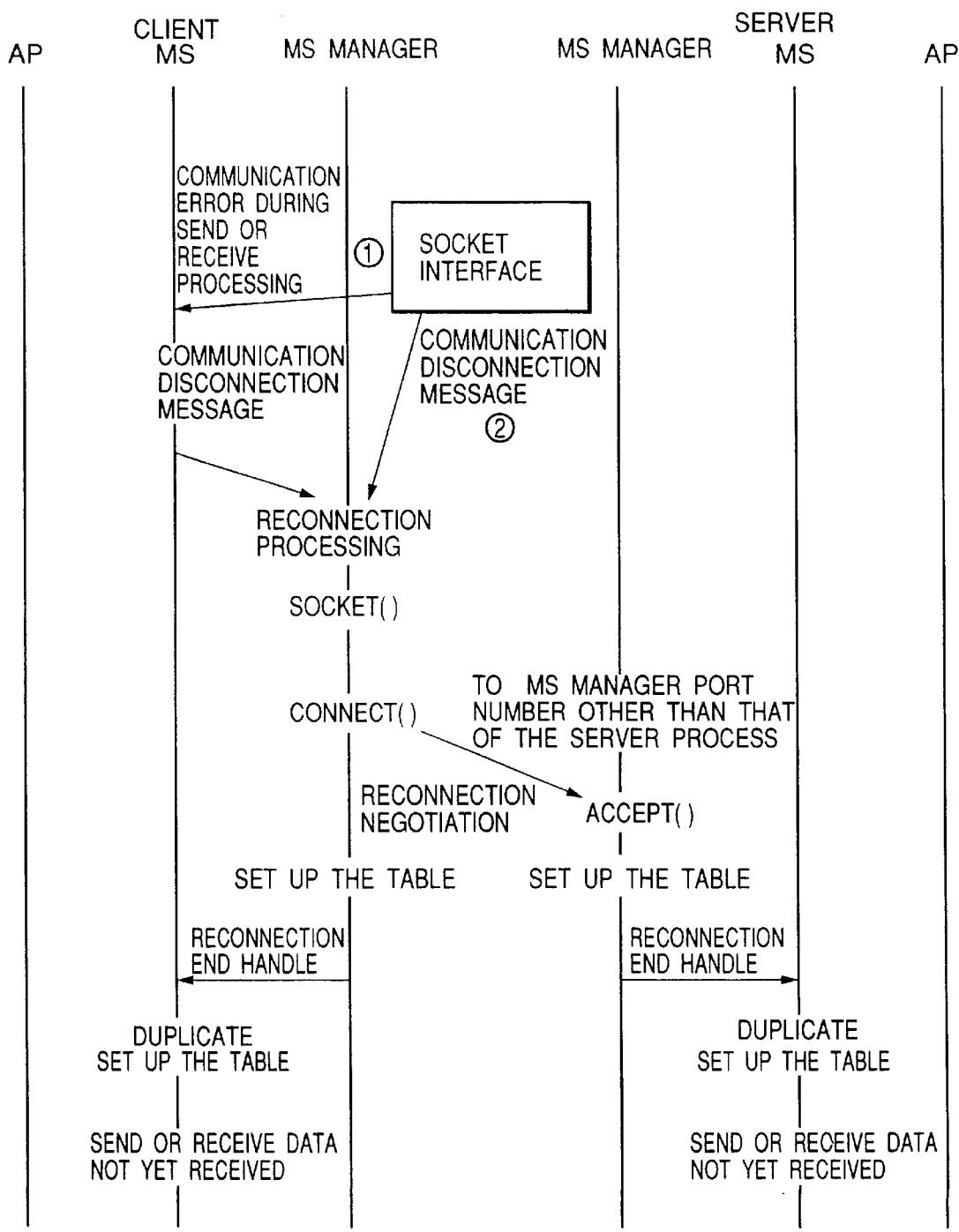
FIG. 9 is a connection sequence diagram when reconnection is performed in the embodiment according to the present invention.

In the above description, the MS portion 204 checks if the handles match to recognize that the line was disconnected and then reconnected. Another embodiment will be described with reference to FIG. 9. In this embodiment, when a communication line is disconnected due to a failure and then reconnected, the following processing is performed after reconnection, as shown in FIG. 9. That is, the MS Manager portion 205 informs the MS portion 204 of reconnection completion as well as the communication connection handle of the new communication line. Upon receiving reconnection completion information, the MS portion 204 issues 'Duplicate' (duplication command) to the socket interface according to the communication connection handle of the new line to get a handle identifying the same socket. As shown in FIG. 8, the MS portion 204 stores a new handle '12' in the MS Manager portion communication handle column of the handle management table 810 that is in the row for the handle '1'. Similarly, the MS portion 204 stores '112' in the communication connection handle column in the row for handles '1' and '12'. In addition, the MS portion 204 re-sends data not yet received by the partner because of a line disconnection. In this case, the MS portion 204 recognizes that the line has been reconnected. Therefore, when a communication request (send( ) command) is sent from the application, the MS portion 204 need not check that the handle is the latest one. It obtains the communication connection handle from the handle management table 81, converts the control handle to the actual communication handle, and then starts communication.

In this embodiment, the MS portion 204 recognizes that the line has been reconnected at reconnection time and re-sends data. It need not check if the handle is the latest one when a communication request (send( ) command) is sent from the application.

In some cases, a server application duplicates or inherits a handle for use by another application (see AP202 and AP203 in FIG. 2). In this case, the application duplicates a control handle. For the application (AP203) which has received a control handle, the MS portion 204b receives a handle from the MS Manager portion 205 via the control connection 209. This handle is duplicated (socket 225) for use in communication.

The above embodiment allows an existing application, which is designed with little or no consideration of line disconnection, to continue communication even when a communication error occurs, with no need to modify the application. Therefore, when communication is disconnected in an environment where the communication quality is poor, the user can continue communication without having to restart the operation from the beginning.

As described above, the present invention allows the user to continue combination even when communication is disconnected due to a communication error without affecting application operation and without having to modify the application.

What is claimed is:

1. An information processing system which starts an application to communicate with another information processing system by using a communication interface connected to a communication line, comprising:

a pseudo communication interface and a pseudo communication manager, wherein said pseudo communication manager, upon receipt of a communication request from said pseudo communication interface, causes said communication interface to make a connection between said information processing system and said another information processing system, obtains an identification of said communication line used for the connection between said information processing system and said another information processing system from said communication interface, reports said identification of said communication line to said pseudo communication interface, and reports an identification of a pseudo communication line to a pseudo communication interface and to said application, wherein said pseudo communication interface, in response to a communication request from said application to said another information processing system, reports said request to said pseudo communication manager to obtain said identification of said communication line and said identification of said pseudo communication line from said pseudo communication manager, wherein when data is transmitted from said application, said pseudo communication interface changes said identification of said pseudo communication line which has been attached to said data to said identification of said communication line obtained from said pseudo communication manager, and transmits said data to said communication interface, and wherein when data from said another information processing system is transmitted from said communication interface, said pseudo communication interface changes said identification of said communication line attached to said data to said identification of said pseudo communication line obtained from said pseudo communication manager, and transmits said data to said application.

2. An information processing system as claimed in claim 1, wherein when an identification of another communication line is reported from said pseudo communication manager, said pseudo communication interface changes the identification of said pseudo communication line attached to said data transmitted from said application to said identification of said another communication line, and transmits said data to said communication interface, and wherein said pseudo communication interface changes said identification of said another communication line attached to data from said another information processing system transmitted by said communication interface to said identification of said pseudo communication line, and transmits said data to said application.

3. An information processing system as claimed in claim 2, wherein if disconnection of said communication line is detected, said pseudo communication manager causes said communication interface to connect said information processing system to said another information processing system via said another communication line being different from said communication line, obtains said identification of said another communication line used for connection between said information processing system and said another information processing system from said communication interface, and reports said identification of said another communication line to said pseudo communication interface.

4. An information processing system as claimed in claim 2, wherein if disconnection of said communication line is detected, said pseudo communication interface transmits a message to said pseudo communication manager and said pseudo communication manager causes said communication interface to connect said information processing system to said another information processing system via said another communication line being different from said communication line, obtains said identification of said another communication line used for connected between said information processing system and said another information processing system from said communication interface, and reports said another communication line to said pseudo communication interface.

5. An information processing system as claimed in claim 1, wherein said pseudo communication interface has a table indicating correspondence between said identification of said communication line and said identification of said pseudo communication line, changes said identification of said communication line attached to data transmitted from said communication interface to said identification of said pseudo communication line, and changes the identification of said pseudo communication line attached to data transmitted from said application to said identification of said communication line by referring to said table.

6. An information processing system as claimed in claim 1, wherein a communication with said anther information processing system is performed by using TCP/IP, said identification of said communication line is a handle of a socket, and said pseudo communication line is a connection.

7. A program product for allowing an application to be executed on an information processing system to communicate with another information processing system employing a communication interface connected to a communication line, comprising:
  a program for constructing a pseudo communication interface and a program for constructing a pseudo communication manager, on said information processing system, wherein:
  said pseudo communication manager causes said communication interface to make a connection between said information processing system and said another information processing system, upon receipt of a communication request from said pseudo communication interface;
  obtaining an identification of the communication line used for connection between said information processing system and said another information processing system from said communication interface, reporting the identification of said communication line to said pseudo communication interface, and reporting an identification of a pseudo communication line to said pseudo communication interface and said application; and
  in said pseudo communication interface, in response to a communication request to said another information processing system from said application, fetching and reporting said request to said pseudo communication manager, and obtains said identification of said communication line and said identification of said pseudo communication line from said pseudo communication manager;
  when data is transmitted from said application, changing said identification of said pseudo communication line attached to said data to said identification of said communication line obtained from said pseudo communication manager and transmitting said data to said communication interface; and
  when data from another information processing system is transmitted from said communication interface, changing said identification of said communication line attached to said data to said identification of said pseudo communication line obtained from said pseudo communication manager, and transmitting said data to said application.

8. A program product for allowing an application to be executed on an information processing system to communicate with another information processing system employing a communication interface connected to a communication line, comprising:
  a storage medium; and
  a program, stored on said storage medium, for constructing a pseudo communication interface and a program for constructing a pseudo communication manager, on said information processing system, wherein:
  said pseudo communication manager causes said communication interface to make a connection between said information processing system and said another information processing system, upon receipt of a communication request from said pseudo communication interface;
  obtaining an identification of the communication line used for connection between said information processing system and said another information processing system from said communication interface, reporting the identification of said communication line to said pseudo communication interface, and reporting an identification of a pseudo communication line to said pseudo communication interface and said application; and
  in said pseudo communication interface, in response to a communication request to said another information processing system from said application, fetching and reporting said request to said pseudo communication manager, and obtains said identification of said communication line and said identification of said pseudo communication line from said pseudo communication manager;
  when data is transmitted from said application, changing said identification of said pseudo communication line attached to said data to said identification of said communication line obtained from said pseudo communication manager and transmitting said data to said communication interface; and
  when data from another information processing system is transmitted from said communication interface, changing said identification of said communication line attached to said data to said identification of said pseudo communication line obtained from said pseudo communication manager, and transmitting said data to said application.

9. A program product as claimed in claim 8, further comprising a recording medium which stores said program for constructing said pseudo communication interface and said program for constructing said pseudo communication manager.

10. A program product as claimed in claim 8, wherein when an identification of a another communication line is reported from said pseudo communication manager, said pseudo communication interface changes the identification of said pseudo communication line attached to said data transmitted from said application to said identification of said another communication line, and transmits said data to said communication interface, and
  wherein said pseudo communication interface changes said identification of said another communication line attached to data from said a another information processing system transmitted by said communication interface to said identification of said pseudo communication line, and transmits said data to said application.

11. A program am product as claimed in claim 10, wherein if disconnection of said communication line is detected, said pseudo communication manager causes said communication interface to connect said information processing system to said another information processing system via said another communication line being different from said communication line, obtains said identification of said another communication line used for connection between said information processing system and said another information processing system from said communication interface, and reports said identification of said another communication line to said pseudo communication interface.

12. A program product as claimed in claim 8, wherein if disconnection of said communication line is detected, said pseudo communication interface transmits a message to said pseudo communication manager; and said pseudo communication manager causes said communication interface to connect said information processing system to said another information processing system via said another communication line being different from said communication line, obtains said identification of said another communication line used for connection between said information processing system and said another information processing system from said communication interface, and reports said identification of said another communication line to said pseudo communication interface.

13. A program product as claimed in claim 8, wherein said pseudo communication interface has a table indicating correspondence between said identification of said communication line and said identification of said pseudo communication line, changes said identification of said communication line attached to data transmitted from said communication interface to said identification of said pseudo communication line, and changes the identification of said pseudo communication line attached to data transmitted from said application to said identification of said communication line by referring to said table.

14. A program product as claimed in claim 8, wherein a communication with said another information processing system is performed by using TCP/IP, said identification of said communication line is a handle of a socket, and said pseudo communication line is a connection.

\* \* \* \* \*